(12) United States Patent
Marchal

(10) Patent No.: US 8,061,739 B2
(45) Date of Patent: Nov. 22, 2011

(54) THERMAL INSULATION DEVICE OF A SCREWED JUNCTION

(75) Inventor: Philippe Marchal, Vaucresson (FR)

(73) Assignee: Majus, London (GB)

( * ) Notice: Subject to any disclaimer, the term of this patent is extended or adjusted under 35 U.S.C. 154(b) by 390 days.

(21) Appl. No.: 12/285,410

(22) Filed: Oct. 3, 2008

(65) Prior Publication Data

US 2009/0096208 A1    Apr. 16, 2009

(30) Foreign Application Priority Data

Oct. 3, 2007  (FR) .................................. 07 06920

(51) Int. Cl.
*F16L 3/00* (2006.01)
(52) U.S. Cl. .................. 285/123.1; 285/48; 285/123.15
(58) Field of Classification Search ............ 285/47, 285/123.1, 123.2, 123.6, 123.15, 124.1, 288.1, 285/123.3, 48, 53, 904
See application file for complete search history.

(56) References Cited

U.S. PATENT DOCUMENTS

| | | | | |
|---|---|---|---|---|
| 1,103,630 A * | 7/1914 | Stewart | ................... | 285/288.1 |
| 1,324,969 A * | 12/1919 | Kuhn et al. | ................... | 219/227 |
| 1,598,794 A * | 9/1926 | Warren | ................... | 166/89.1 |
| 1,601,187 A * | 9/1926 | Myers et al. | ................... | 277/336 |
| 1,966,248 A * | 7/1934 | Kane | ................... | 166/380 |
| 1,981,863 A * | 11/1934 | Harris | ................... | 285/123.2 |
| 2,273,154 A * | 2/1942 | Stromsoe | ................... | 285/55 |
| 2,980,448 A * | 4/1961 | Holben | ................... | 285/47 |
| 3,574,357 A * | 4/1971 | Alexandru et al. | ................... | 285/47 |
| 3,648,734 A * | 3/1972 | Waite et al. | ................... | 138/113 |
| 3,885,595 A * | 5/1975 | Gibson et al. | ................... | 285/47 |
| 3,988,029 A * | 10/1976 | Gibson | ................... | 285/47 |
| 4,332,401 A * | 6/1982 | Stephenson et al. | ................... | 285/47 |
| 4,340,245 A * | 7/1982 | Stalder | ................... | 285/53 |
| 4,415,184 A * | 11/1983 | Stephenson et al. | ................... | 285/47 |
| 4,538,834 A * | 9/1985 | Brady et al. | ................... | 285/47 |
| 4,579,373 A * | 4/1986 | Neal et al. | ................... | 285/47 |
| 6,231,086 B1 * | 5/2001 | Tierling | ................... | 285/47 |

FOREIGN PATENT DOCUMENTS

| FR | 2 797 490 A1 | 2/2001 |
|---|---|---|
| FR | 2 894 316 A1 | 6/2007 |
| WO | WO 2006/109015 A1 | 10/2006 |

* cited by examiner

*Primary Examiner* — David E Bochna
(74) *Attorney, Agent, or Firm* — Oliff & Berridge, PLC

(57) ABSTRACT

A thermal insulation device of a screwed junction between two sections of pipe comprising an outer pipe surrounding an inner pipe between which thermal insulation material is positioned, the inner pipes being assembled together by the screwed junction, one section delimiting a male portion and the other delimiting a female portion, the portions being fitted together to delimit the screwed junction, wherein the male portion comprises the inner pipe and a tubular part connected thereto, the diameter of the tubular part being less than that of the outer pipe, and wherein the female portion comprises a part of the outer pipe and an intermediate tubular part connecting the inner pipe to the outer pipe, the inner diameter of the intermediate part being greater than the outer diameter of the tubular part of the male portion, the thermally insulating material being inserted between the outer pipe and the intermediate part.

8 Claims, 3 Drawing Sheets

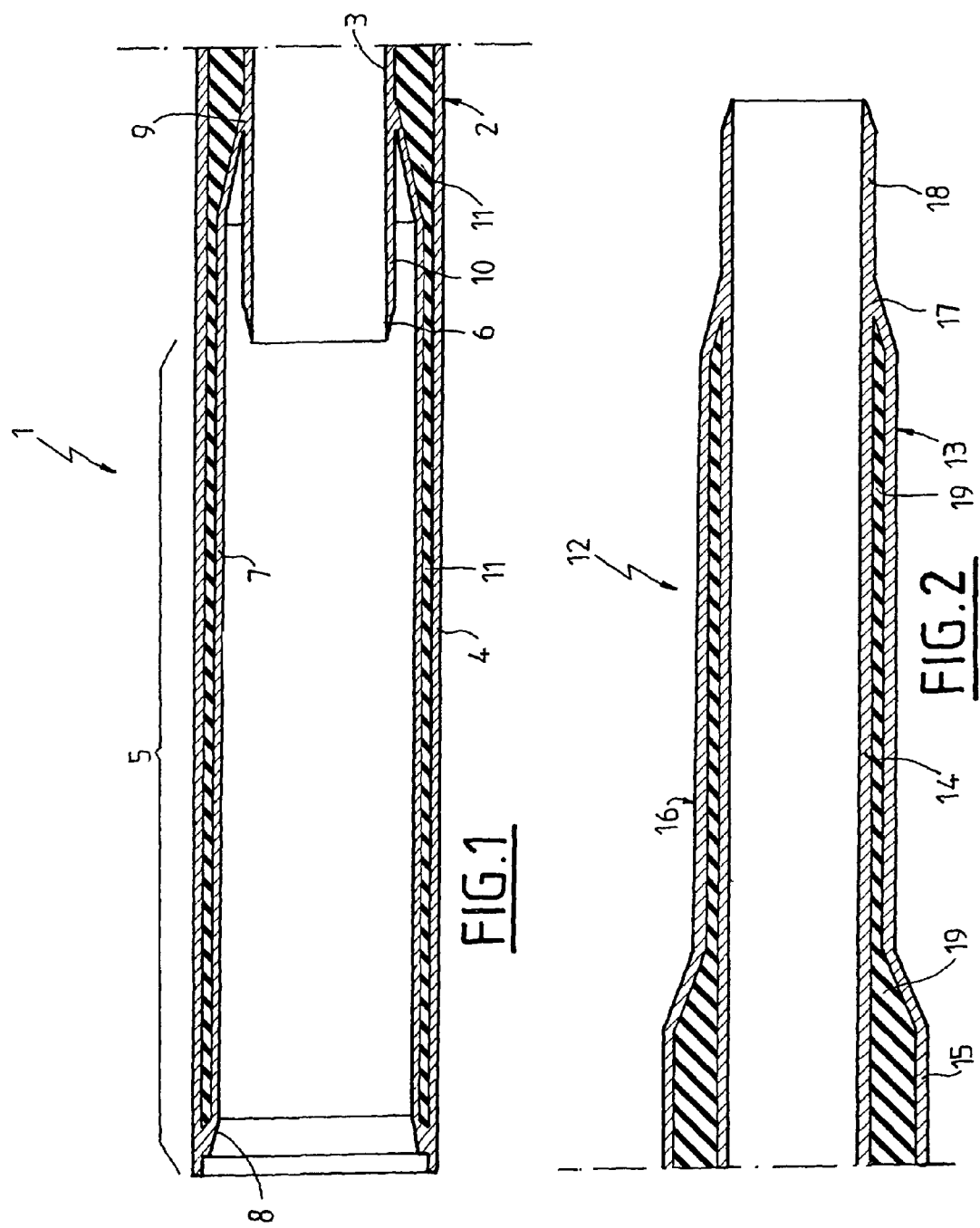

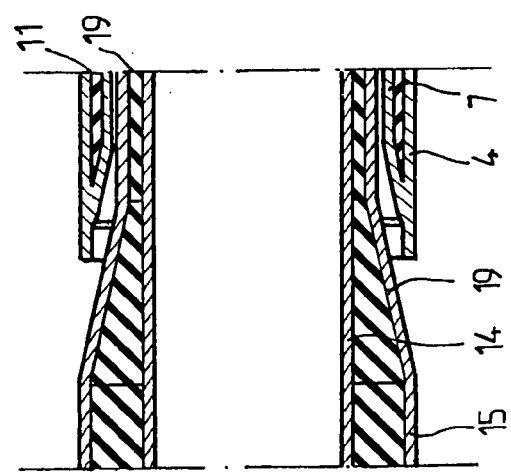
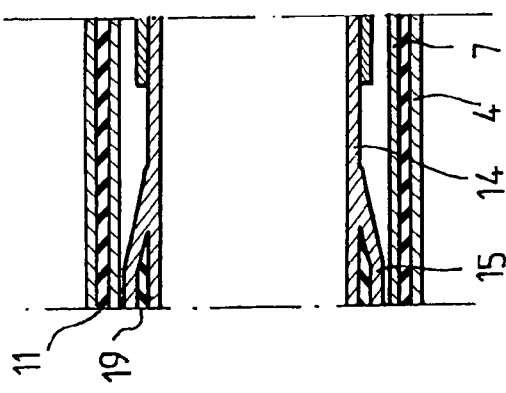
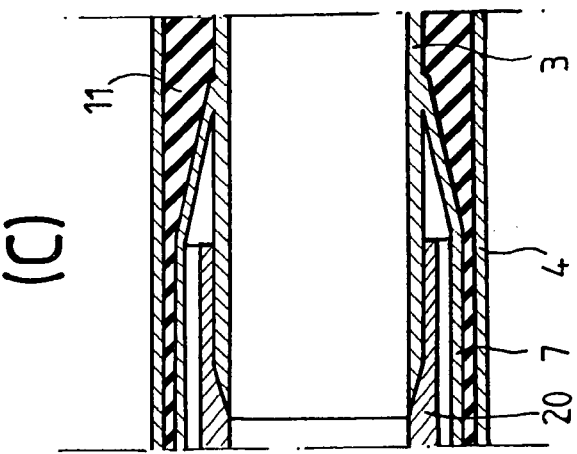

THERMAL INSULATION DEVICE OF A SCREWED JUNCTION

BACKGROUND OF THE INVENTION

1. Field of the Invention

The technical scope of the present invention is that of double wall pipes comprising an inner pipe and an outer pipe between which a heat insulator has been inserted and more particularly means to link two sections of piping.

2. Description of the Related Art

The piping in question relates to double wall tubing enabling the transportation of fluid and installed in a well reinforced by casing pipes. These pipes are generally manufactured in the form of sections of pre-determined length, 8 to 12 meters, for example, which must be connected together. The problem arises thereafter of the thermal insulation at the junction of two consecutive tubings. Indeed, it is important to avoid any cooling of the relatively hot fluid from the deep deposit and the ambient temperature of the surface or any heat exchange during the injection of vapor. In this case, the purpose of the thermal insulation is to preserve the quality of the vapor and to protect the casing pipe from excessive heat or else to modify the thermal balance of the subsoil. Among the negative effects of any cooling of the crude oil in this type of piping, we can mention the following points:

paraffin deposits,
asphaltene precipitation,
hydrate formation,
heat transfer with the casing pipes thereby damaging said casing pipes.

These sections are generally connected by screwing the inner pipes according to two main principles: screwing together male-female ends or screwing together male-male ends using a fitting female-female generally named coupling.

Given the reduced amount of space available and the high pressures in a well, we are obliged to look towards highly effective thermal insulation materials such as those developed for use in space or cryogenics, using vacuum-based technologies and anti-radiative screens.

In practice, we observe that the heat losses at the junction of two sections are easily ten times greater than those of the sections themselves. Thus, for an exchange coefficient for a single section of around 0.1 $W/m^2/K$, this coefficient is one thousand times greater at the junction. Thus, if the coefficient is of 0.1 $W/m^2/K$ in the continuous sections, globally with the existing technologies it is very difficult to obtain better than 2.5 $W/m^2/K$.

Thus, to overcome this drawback, a cylindrical insulation material has been proposed, made of a plastic material and installed at the connector. These materials are made using dense materials which are therefore not very insulating. However, this technique does not enable the use of good quality insulation materials, such as honeycomb structure materials, for example polypropylene foam with the inclusion or not of glass micro-beads. By way of example, we observe that a 15 mm cylinder made of solid polypropylene provides heat insulation of around 10 to 30 $W/m^2/K$ compared with the 0.1 $W/m^2/K$ obtained by a vacuum insulation of the same thickness.

We note the great importance of the problem of thermal insulation at the connectors of two consecutive sections which may considerably reduce the thermal performances of such a pipeline.

SUMMARY OF THE INVENTION

The aim of the present invention is to supply efficient insulation means for the connector between two double pipe sections made of a screwed joining so as to minimize heat losses in crude oil production piping. It is therefore an objective of the invention to achieve a global value in the order of magnitude of 1 $W/m^2/K$ or better.

The invention thus relates to a thermal insulation device of a screwed junction between two sections of pipe constituted by an outer pipe surrounding an inner tubing between which thermal insulation material is positioned, the inner tubings of each section being assembled together by said screwed junction, one section delimiting a male portion and the other section delimiting a female portion, the two portions being fitted into one another in order to delimit said screwed junction, wherein the male portion is constituted by the inner pipe and a tubular part connected to the inner pipe, the diameter of said tubular part being less than that of the outer pipe, said male portion incorporating an insulating material, and wherein the female portion is constituted by a part of the outer pipe and an intermediate tubular part connecting the inner pipe to the outer pipe, the inner diameter of said intermediate part being greater than that of the outer diameter of the tubular part of the male portion, a thermally insulating material being inserted between the part of the external pipe and the intermediate part.

According to one characteristic of the invention, the end of the outer pipe is welded, at the male portion, to the inner pipe.

According to another characteristic of the invention, the tubular intermediate part is welded at each of its ends firstly in the outer pipe and secondly on the inner pipe.

According to yet another characteristic of the invention, the female portion and the male portion are of a length that is comprised between 2 and 20% of the full length of one pipe section.

According to yet another characteristic of the invention, the thermal insulation material inserted between the two internal and external pipes is identical to the thermal insulation material inserted at the male and female portions, the enclosure formed by the different pipes thus constituting a continuous space.

According to yet another characteristic of the invention, the thermal insulation material is constituted by a micro-porous material or a multilayered insulation material made of reflective sheets in a vacuum.

According to yet another characteristic of the invention, the inner pipes are provided with male threading and are screwed to one another by means of a linking element (20) with a female-female thread.

A first advantage of the joining device according to the invention lies in the fact that the insulation obtained near the screwed junction is of the same order of magnitude as that of the section itself.

Another advantage of the device lies in the fact that the connector is made in the form of repetitive elements which nest into one another.

Yet another advantage of the device lies in the fact that the connector forms part of the casing itself.

According to yet another advantage of the invention lies in the maintaining of the thermal insulation despite the low annular space provided in the male and female portions in the range of 1 to 2 mm.

BRIEF DESCRIPTION OF THE DRAWINGS

Other characteristics, particulars and advantages of the invention will become more apparent from the following description given hereafter by way of illustration with reference to the appended drawings, in which:

FIG. 1 represents a longitudinal section of the female part of the connector,

FIG. 2 represents the same section of the male part of the connector,

FIGS. 4 to 6 represent enlarged section views of sections A, B, and C of FIG. 3 showing details of the embodiment.

DETAILED DESCRIPTION OF PREFERRED EMBODIMENTS

Figure 3:
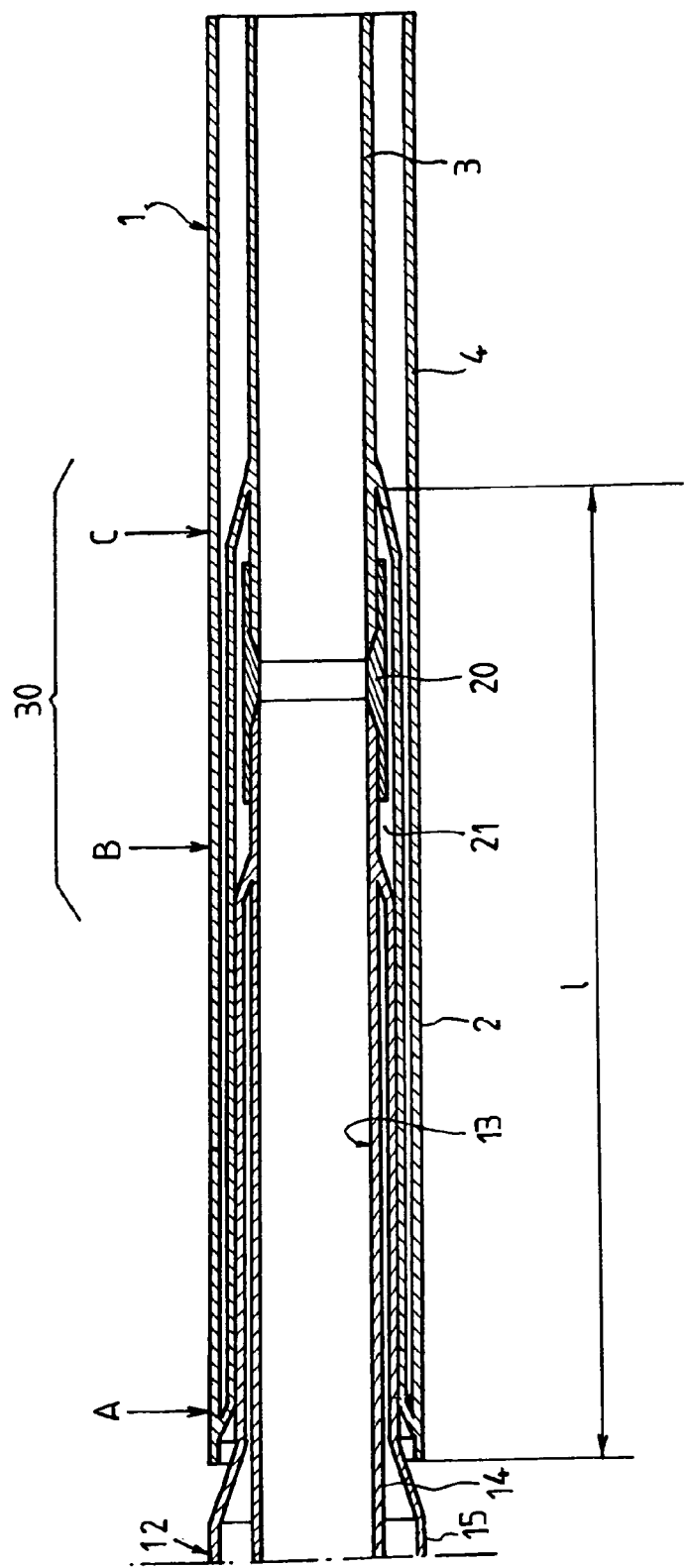
FIG. 3 is a longitudinal section showing how the connector is assembled.

In the following description, we will speak of the insulation of the junction of two sections of pipe, that is to say a pipe constituted by a metallic outer pipe and a metallic inner pipe regardless of the use to which such piping will be put, be it for the transportation of a fluid, such as for example crude oil, or for the injection of a vapor.

FIG. 1 shows a section of the female element 1 of a first section 2 or female portion of double pipe, classically constituted by an inner pipe 3 and an outer pipe 4. The outer pipe 4 incorporates a prolongation 5 extending beyond the extremity 6 of the free part 10 of the inner pipe 3. An intermediate tubular part 7 enables the free extremity of the outer pipe 4 to be connected to the inner pipe 3 for example by welding at each of its extremities 8 and 9. The extremity 6 of the inner pipe is threaded so as to receive a joining element with the inner pipe of the other section as will be explained hereafter. We see that the intermediate tubular part 7 thus attached to the pipes enables a closed space to be delimited in which the thermal insulation material 11 is inserted. FIG. 1 shows that the inner diameter of part 7 is greater than the outer diameter of tubular part 16 shown in FIG. 2.

It goes without saying that the inner and outer pipes are of the same metallic composition and that they are identified by separate reference only for the sake of convenience. These different elements are, for example, made of steel.

FIG. 2 shows a section of a male element 12 of a second section or male portion 13, classically constituted by an inner pipe 14 and on outer pipe 15. The male element 12 thus comprises a tubular part 16 of a smaller diameter than that of the outer pipe 15. The extremity 17 of the outer pipe 15 is, for example, welded onto the inner pipe 14 leaving a free part 18 of this inner pipe. The extremity of the inner pipe is threaded so as to receive a linking element as will be explained hereafter. The Figure shows that the external diameter of the tubular part 16 is less than the inner diameter of intermediate tubular part 7 in FIG. 1. The thermal insulation material 19 inserted between the two pipes 14 and 15 is also inserted between the inner pipe 14 and the tubular part 16 of the outer pipe.

The connection of the two male and female portions described above constitutes the insulated screwed junction device 30 between two sections 1 and 12 of piping, with a very low thickness of thermal insulation material 11 and 19, in the range of 1 to 2 mm. Moreover the length of the male portion 13 and female portion 2 is long as possible for example in the range of 2 to 20% of the length of the portions 1 and 12.

It is to be noted the device according to the invention is able to be adapted to all types of conventional screwed tubing junctions and is of a resistance in the same range of the pipe itself. This device allows also the users to maintain their former manufacture process (screwed junction, operation tools, storing, procedure and manipulation, etc. . . . ).

FIG. 3 shows a longitudinal section at the connecting device of the two sections of double wall pipe. For the sake of clarity, the insulation materials 11 and 19 have been left out.

In this Figure, the screwed junction 30 between the inner pipes 3 and 14 requires the use of an additional or linking part 20 which is generally mounted before the two pipes are brought into position. Thus, in this case, we can consider that the screwed connector is a male-male junction and part 20 is a female-female coupling. Naturally, by way of a variant, male-female screwed connectors may be used.

This joining leaves a free space 21 between the intermediate tubular part 7 and the inner pipes 3 and 14. This space may be left as it is without significant lost of insulation or else be filled by an insulation material.

Someone skilled in the art will be able to practically determine the length to be provided for the joining device depending on the lengths of the sections 1 and 12 of piping being used. However, we have determined that the junction between the female portion 2 and the male portion 13 could have a length between 2 and 20% of the total length of the section in question.

Thus, the joining device enables the conception of a structure to be designed in which the thermal insulation material inserted between the inner and outer pipes is identical to the insulation material inserted at the male and female portions. In other words, there is no discontinuity of insulation in the piping.

The thermal insulation material may be constituted by a micro-porous material or a multi-layer insulation using reflective sheets in a vacuum.

FIGS. 4 to 6 show enlargements of parts A, B and C referenced in FIG. 3.

FIG. 4 shows the outer pipe 4 integral with the intermediate tubular part 7 of the first section, the inner 14 and outer 15 pipes of the second section. We can see that insulation material 11 is effectively inserted between pipe 4 and part 7 and insulation material 19 is inserted between inner 14 and outer 15 pipes even in where the annular section is reduced.

FIG. 5 shows the outer pipe 4 and the intermediate tubular part 7 of the first section and the inner 14 and outer 15 pipes of the second section, insulation materials 11 and 19 being visible.

FIG. 6 shows the outer 4 and inner 3 pipes of the first section and the intermediate tubular part 7 and the linking part 20 between the inner pipes of the two sections.

What is claimed is:

1. A thermal insulation device comprising a screwed junction between two sections of pipe, wherein each of the two sections of pipe comprises:

an outer pipe surrounding an inner pipe between which thermal insulation material is positioned, said inner pipe of each said section being assembled together by said screwed junction, one of said two sections delimiting a male portion and the other of said sections delimiting a female portion, said two portions being fitted into one another in order to delimit said screwed junction;

wherein said male portion comprises:

said inner pipe, a narrowed tubular part connected to said inner pipe, a diameter of said narrowed tubular part being less than a diameter of said outer pipe, said male portion incorporating an insulating material;

wherein said female portion comprises:

a part of said outer pipe, an intermediate tubular part connecting said inner pipe to said outer pipe, an inner diameter of said intermediate tubular part being greater than the outer diameter of said narrowed tubular part of said male portion; and a thermally insulating material being inserted between said part of the outer pipe and said intermediate tubular part.

2. A thermal insulation device according to claim 1, wherein an end of said outer pipe is welded, at said male portion, to said inner pipe.

3. A thermal insulation device according to claim 1, wherein a first end of said intermediate tubular part is welded to said outer pipe and a second end of said intermediate tubular part is welded to said inner pipe.

4. A thermal insulation device according to claim 3, wherein said thermal insulation material inserted between said two inner pipes and outer pipes is identical to the thermal insulation material inserted at said male and female portions, an enclosure formed by said inner pipes and outer pipes thus constituting a continuous space.

5. A thermal insulation device according to claim 4, wherein said thermal insulation material is constituted by a micro-porous material or a multilayered insulation material made of reflective sheets in a vacuum.

6. A thermal insulation device according to claim 1, wherein said female portion and said male portion are each of a length that is in a range of 2 to 20% of a full length of one said pipe section.

7. A thermal insulation device according to claim 1, wherein said thermal insulation material inserted between said two inner pipes and outer pipes is identical to the thermal insulation material inserted at said male and female portions, an enclosure formed by said inner pipes and outer pipes thus constituting a continuous space.

8. A thermal insulation device according to claim 1, wherein said thermal insulation material is constituted by a micro-porous material or a multilayered insulation material made of reflective sheets in a vacuum.

* * * * *